(12) United States Patent
Lackey

(10) Patent No.: US 11,561,006 B2
(45) Date of Patent: Jan. 24, 2023

(54) APPARATUS AND PROCESS FOR A KINETIC FEED PLUG SCREW

(71) Applicant: M.S.T. Corporation, Prineville, OR (US)

(72) Inventor: Raymond Edward Lackey, Prineville, OR (US)

(73) Assignee: M.S.T. Corporation, Prineville, OR (US)

(*) Notice: Subject to any disclaimer, the term of this patent is extended or adjusted under 35 U.S.C. 154(b) by 238 days.

(21) Appl. No.: 17/078,894

(22) Filed: Oct. 23, 2020

(65) Prior Publication Data

US 2022/0128234 A1 Apr. 28, 2022

(51) Int. Cl.
| | |
|---|---|
| *F23G 5/44* | (2006.01) |
| *B65G 33/14* | (2006.01) |
| *B65G 33/30* | (2006.01) |
| *F23G 5/027* | (2006.01) |

(52) U.S. Cl.
CPC ............ *F23G 5/444* (2013.01); *B65G 33/14* (2013.01); *B65G 33/30* (2013.01); *F23G 5/027* (2013.01)

(58) Field of Classification Search
CPC ......... F23G 5/444; F23G 5/027; B65G 33/14; B65G 33/30
See application file for complete search history.

(56) References Cited

U.S. PATENT DOCUMENTS

| | | | |
|---|---|---|---|
| 1,990,631 A | 12/1932 | Bowling et al. | |
| 1,990,632 A | 12/1932 | Bowling et al. | |
| 2,013,023 A | 8/1933 | Bowling et al. | |
| 2,355,774 A | 11/1941 | Baker et al. | |
| 2,412,709 A | 8/1943 | Bowling et al. | |
| 2,560,147 A | 7/1948 | Anderson | |
| 2,549,997 A | 12/1948 | Zies et al. | |
| 2,971,456 A | 2/1961 | Thomas | |
| 3,406,466 A | 10/1968 | Smith, Jr. | |
| 3,795,386 A | 3/1974 | Carter et al. | |
| 3,862,594 A * | 1/1975 | Stolting | B65G 33/00 100/95 |
| 3,943,034 A | 3/1976 | Wallen | |
| 4,074,803 A | 2/1978 | Kollberg | |
| 4,117,776 A | 10/1978 | Hunt | |
| 4,119,025 A | 10/1978 | Hunt | |

(Continued)

FOREIGN PATENT DOCUMENTS

| | | |
|---|---|---|
| DE | 2165855 A1 | 12/1971 |
| DE | 19935332 C1 | 7/1999 |

(Continued)

OTHER PUBLICATIONS

International Search Report and Written Opinion, PCT/US2021/055133, dated Jan. 24, 2022, pp. 1-9.

(Continued)

*Primary Examiner* — Nathaniel Herzfeld

(74) *Attorney, Agent, or Firm* — Chernoff, Vilhauer, McClung & Stenzel LLP

(57) ABSTRACT

A kinetic feed plug screw apparatus and process for creating the same, where organic raw material or feedstock is transported to a combustion or pyrolysis chamber, and a dynamic seal is concurrently and continuously created between the inlet and outlet to prevent immediate material blowback.

7 Claims, 4 Drawing Sheets

(56) References Cited

U.S. PATENT DOCUMENTS

| | | | |
|---|---|---|---|
| 4,121,967 A | | 10/1978 | Reinhall |
| 4,138,162 A | | 2/1979 | Noren |
| 4,274,786 A | * | 6/1981 | Svensson ................. D21B 1/06 |
| | | | 414/218 |
| 4,391,561 A | | 7/1983 | Smith et al. |
| 4,415,336 A | | 11/1983 | Stasi et al. |
| 4,553,285 A | | 11/1985 | Sachs et al. |
| 4,711,607 A | | 12/1987 | Wynosky et al. |
| 4,881,862 A | * | 11/1989 | Dick ...................... B65G 53/48 |
| | | | 406/60 |
| 4,915,830 A | | 4/1990 | Mackay et al. |
| 5,709,779 A | * | 1/1998 | May .......................... C10B 1/10 |
| | | | 202/99 |
| 5,871,619 A | | 2/1999 | Finley et al. |
| 6,186,060 B1 | * | 2/2001 | Peterson ................. A01F 15/00 |
| | | | 100/138 |
| 7,979,259 B2 | | 7/2011 | Craig et al. |
| 2015/0368862 A1 | | 12/2015 | Genta et al. |

FOREIGN PATENT DOCUMENTS

| | | | |
|---|---|---|---|
| GB | 1421549 A | 1/1976 | |
| WO | 2013126007 A1 | 8/2013 | |
| WO | 2020009634 A1 | 1/2020 | |
| WO | 046186 A1 | 3/2020 | |

OTHER PUBLICATIONS

Zhang, Jun, An Automatic Shake Mechanism for the Biomass Pyrolysis Feeding, Advanced Materials Research, Mar. 2, 2010, pp. 2314-2317, vols. 97-10, Trans Tech Publications, Switzerland.

\* cited by examiner

APPARATUS AND PROCESS FOR A KINETIC FEED PLUG SCREW

CROSS REFERENCE TO RELATED APPLICATIONS

None.

BACKGROUND OF THE DISCLOSURE

The present disclosure generally relates to an apparatus and/or process for creating a kinetic feed plug screw, used to feed organic raw material or feedstock to a combustion chamber, while concurrently creating a seal between the inlet and outlet to prevent material blowback and explosion.

Pyrolysis of organic waste materials is a generally high risk process, as in some applications, conditions of the outlet may reach pressures as high as 1900 psi (131 bar) and temperatures of 800 degrees Celsius. On the inlet side, the atmosphere may be either oxygen or air, or in some cases, more volatile gaseous elements. Oftentimes, if the inlet and outlet portions manage to mix together, across a screw feeder or any other bridging device, the mix will explode and cause substantial damage. The risk exists in applications where the inlet and outlet have a pressure difference, as well as in situations where an outlet may have a steam pressurized vessel containing dangerous chemicals, such as a cellulose fiber processing system.

In the past, plug screw feeders for organic material existed in the form a full housing length plug, i.e., a plug held in place by a full-length pack of the feedstock, a taper plug and screw such as a tapered housing over a matching taper screw. Notably, the plug in these systems were generally greater than 2 feet or more in length. In other words, these plug screw systems are comprised of a plug that coexists with the full taper of the screw, where the system requires that the screws be packed along the full length of the tapers.

Even with these type of lengthy plug screw feeders, the system was not reliable and was still capable of blowback release of dangerous chemicals, and or volatile gas mixtures (i.e., contact mixing). Further, the plug itself was not isolated to a particular section of the apparatus. As such, to lower the risk of contact mixing, the existing prior art plug screw feeders often implemented an additional mechanical check valve, a metal seal, or an outright metal flap-shut plate. However, mechanical valves are prone to obstruct particle flow, and may jam the valve device and prevent the various valve-shutoff features.

With the current existing screw plugs, an issue still existed when the plugs were used in conditions involving a relatively large pressure difference at the inlet and outlet. In these conditions, if the screw bridge was breached, and the plug was bypassed, the supply of plug forming material or feedstock would be immediately lost. The screw feeder would then be breached, initiating dangerous backflow from the screw feeder system outlet, where the backflow would travel through the screw channels, to the screw inlet.

Most importantly, in the current prior art, there is no plug or seal system that possesses real-time and perpetual blowback protection or check capability—in other words, additional time is required to react to feed upsets and blowback incidents. What is desired, therefore, is a kinetic feed plug screw apparatus and process that can be used to feed organic raw material or feedstock to a combustion or pyrolysis chamber, where a dynamic seal is concurrently and continuously created between the inlet and outlet to prevent immediate material blowback.

BRIEF DESCRIPTION OF THE DRAWINGS

For a better understanding of the disclosure, and to show how the same may be carried into effect, reference will now be made, by way of example to the accompanying drawings, which.

DETAILED DESCRIPTION OF PREFERRED EMBODIMENTS

Figure 1:
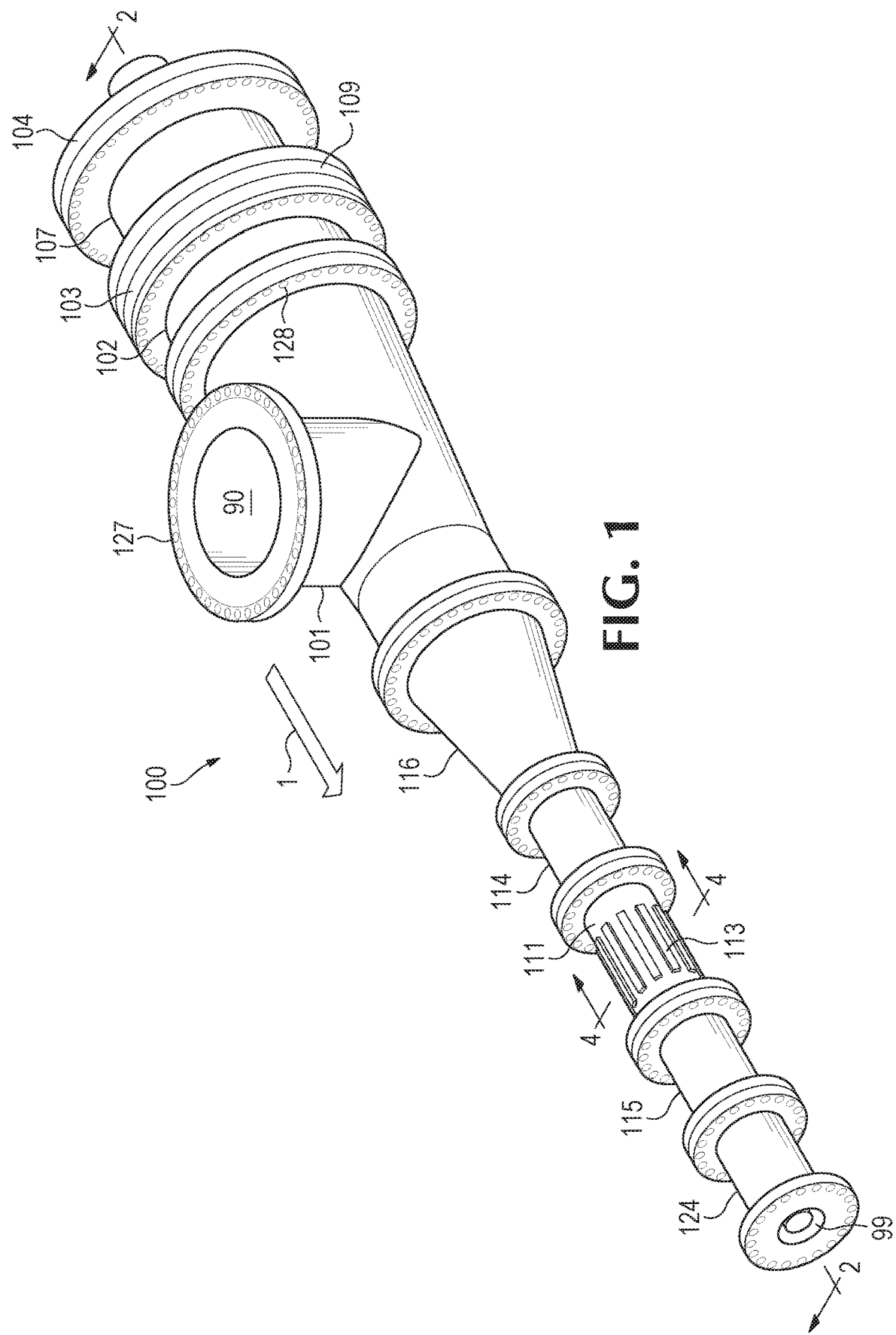
FIG. 1 shows a perspective view of an example of a kinetic feed plug screw apparatus of the present disclosure.

Referring to FIGS. 1-4, an illustrative example of a kinetic feed plug screw ("KSPS") apparatus 100 is shown, where the inlet 90 is fed raw material or feedstock, based on a predetermined type and condition required within the process vessel, and the feedstock is transmitted by a conveyer screw 117, in the general direction shown by arrow 1 in FIG. 1, and passes through an dynamic seal area 96 where the feedstock forms a dynamic seal, and exits the apparatus 100 at the outlet area 99, ready for pyrolysis or combustion in a subsequent vessel (not shown). In a preferred embodiment, the raw material may be pre-processed using other machinery (not shown) to affect the particle size, and size distribution necessary for the vessel conversion process requirements.

In some embodiments, following the general and normal travel direction of the feedstock and conveyer screw 117, the apparatus may comprise of an inlet flange or sleeve 101, where the sleeve may be connected or fastened to a tapered housing or sleeve 116, where the sleeve or housing is further connected to an compression sleeve 114, where the feedstock is greatly compressed within, and then subsequently transferred to a connected to the dynamic seal housing or sleeve 111. In a preferred embodiment, the tapered housing may be at a 20-degree angle. The dynamic seal housing or sleeve 111 may be connected or fastened to a first decompression sleeve 115, which may be further connected to fastened to a second decompression sleeve 124, where the feedstock is further decompressed and subsequently transferred to the outlet area 99. In a preferred embodiment, the bulk density of feedstock entering at the inlet 90 would match the bulk density of the feedstock exiting at the outlet area 99.

In some embodiments, opposite the normal travel direction of the feedstock, the inlet flange or sleeve 101 may be connected or fastened to an inlet adapter 102, where the adapter is further connected or fastened to a labyrinth sleeve 103. The labyrinth sleeve 103 may be attached or fastened to a bushing 109, which may be further attached to a spacer 107, where the spacer is also attached to an additional bushing 104. The screw may be secured by radial and/or thrust bearings 106 and 108, or any other component deemed equivalent. In a preferred embodiment, the inlet sleeve 101 may be slightly tapered at a 10-degree angle.

Figure 2:
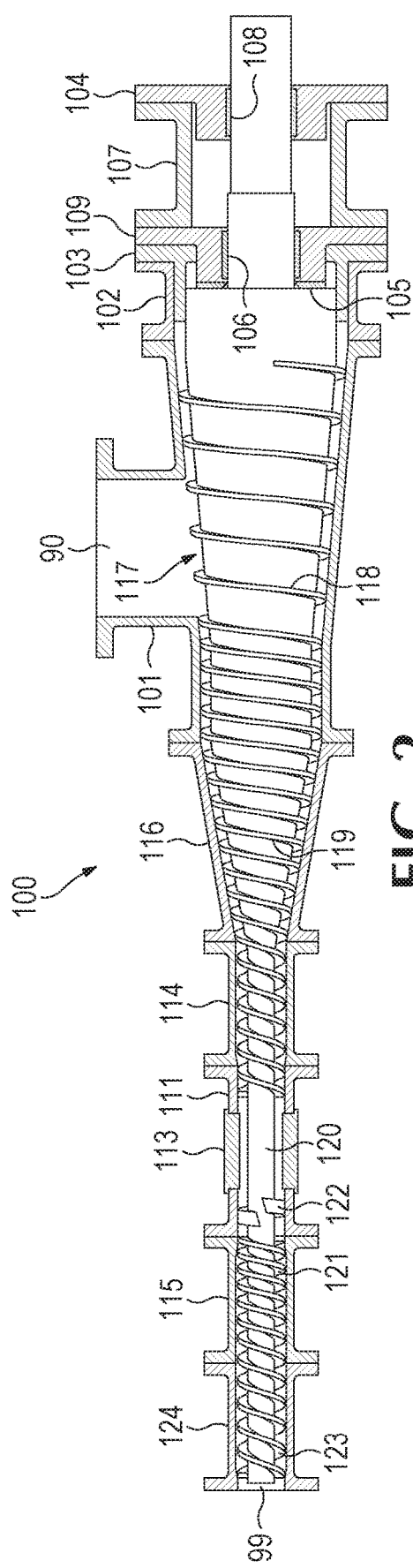
FIG. 2 shows a sectional side view of the apparatus of FIG. 1 taken along lines 2-2 in FIG. 1.
Figure 3:
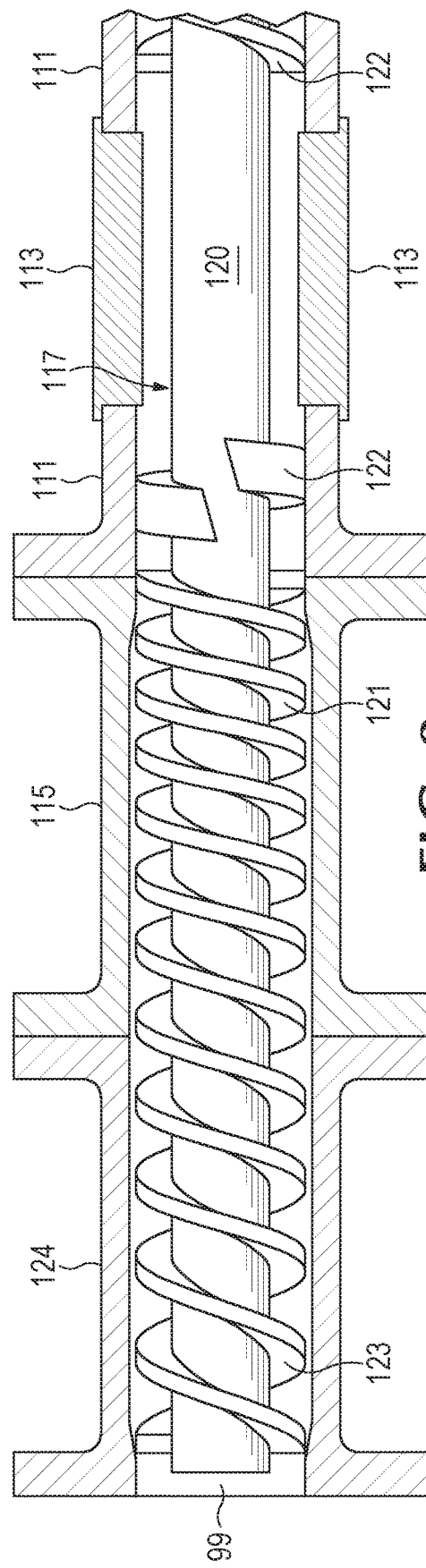
FIG. 3 shows a partial view of the apparatus of FIG. 2.

Referring to FIGS. 2-3, the conveyer screw 117 of the KSPS apparatus is a double-flighted screw system comprising a screw shaft 120 and screw helix or threads such as 118, 119, 121, where the screw and its components are configured to rotate to convey the feedstock or raw material from the inlet to the outlet. In the inlet flange or sleeve 101, the screw 117 may be slightly tapered or conical and may have a larger diameter than the screw housed by tapered housing or sleeve 116.

In the tapered housing or sleeve 116, the screw 117 may also be tapered, where both the thread pitch and major diameter 118 of the screw 117 may greatly decrease so as to significantly compress the feedstock as it is transported through the tapered housing 116 from the inlet 90, in the direction indicated by arrow 1 in FIG. 1. The double-flighted system allows the screw to naturally center along its axis and thus provides spiral force vectorial stabilization of the feedstock.

As the feedstock is being fed into the screw, and the screw continues to turn, the driving mechanism for the formation of a plug is maintained. Further, the feedstock is approximately centered along the screw, thereby increasing the bending stability of the screw's flight and shaft. In some embodiments, the screw flight may increase (not shown) in the tapered housing 116 so as to magnify the compression of the feedstock. In a preferred embodiment, the tapered housing may be at a 20-degree angle. The inlet sleeve, tapered housing sleeve, compression sleeve, dynamic seal housing or sleeve, and decompression sleeve(s) are all joined by means such as threads, screws, rivets and other alternatives.

As shown in FIGS. 2-3, after the feedstock is transported through the tapered housing 116 and the compressed sleeve 114, the feedstock then reaches the dynamic seal housing or sleeve 111. Within dynamic seal housing 111, the significantly compressed feedstock forms a dynamic seal as the feedstock is transported or conveyed by the rotating screw shaft 120 without screw flights. The seal formed by the feedstock is dynamic as it is continuously forming and moving axially toward the outlet 99. The dynamic seal serves as a barrier and prevents the two atmospheres located at the inlet and outlet from contact. Further, the seal stabilizes the screw, prevents the screw from bending and simultaneously maintains the center positioning requirements for the screw system within its housing.

Figure 4:
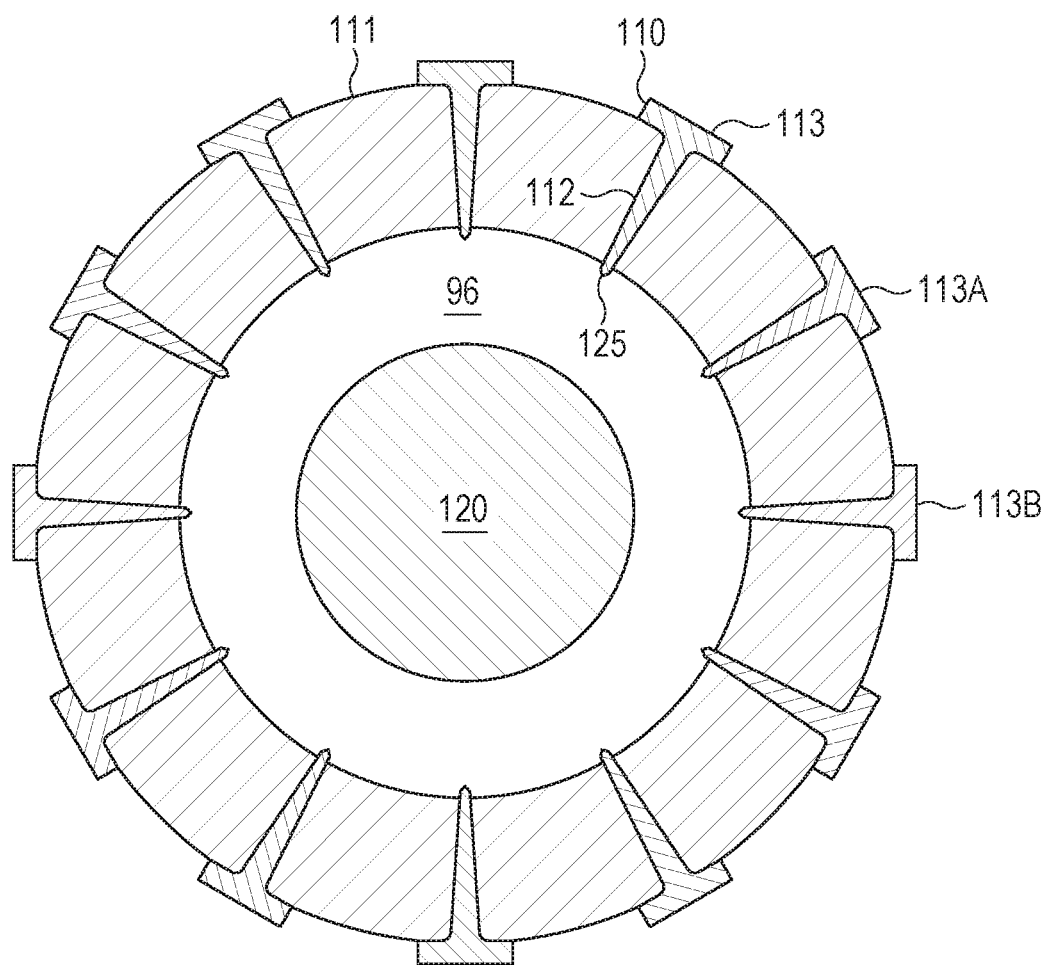
FIG. 4 shows a sectional view of a dynamic seal or a plug located within a dynamic seal housing of the apparatus of FIG. 1 taken along lines 3-3 in FIG. 1.

As shown in FIGS. 3-4, the dynamic seal housing 111 also comprises a series of anti-rotation bars 113, such as bars 113A, 113B, where the bars are placed in a radial fashion along the circular sleeve 111 and the longitudinal length of the bars are the same as the length of the dynamic seal housing 111. The bars may have a flange 110 that extend to the exterior of the dynamic seal housing 111, and a narrow body 112 that extends through the dynamic seal housing in a generally perpendicular manner, where the tip of the bars 125 are exposed along the interior surface of the sleeve and form a groove on the interior of the sleeve. The exposed tip 125 of the grooves or bars 113 serve a number of purposes, as the bars may be used to increase compaction or maintain a desired density of the feedstock. Further, the bars prevent the feedstock from rotating axially along the screw shaft 120 within the seal sleeve 111, and guide the compressed feedstock laterally across the shaft 120, allowing the feedstock to form a dynamic seal or annular plug within this section, preventing the escape, and/or cross mixture of the volatile gases on each end of the screw feeder.

Referring to FIG. 3, within the dynamic seal housing 111, the compressed and dynamic seal is then contacted by a cam 122 which is connected to the screw shaft 120 that impart axial movement as the cam rotates. The cam also has a number of features, one of them serving as a cutoff tool for the dynamic seal or plug, where the compressed plug or dynamic seal is "peeled off," as the cam rotates in the opposite direction of the threads. In other words, the dynamic seal formed by the compressed feedstock is primarily or only within the inner portion of the dynamic seal housing that is upstream of the cam.

The cam 122 is critical as the dynamic seal is partially controlled in part by the cam, where the cam regulates the rate and control of the densified plug as it is cut off and flow-modified into the decompressed sleeves of the system. By adjusting the surface pitch of the cam, the cam imposes a resistance to the proximity rate of axial flow of the feedstock entering the cam, compared to the feedstock flow rate in compressed sleeve 114. In a preferred embodiment, the cam facilitates the formation of the dynamic seal or plug, imparting the mechanical and physical characteristics necessary for the feedstock plug to properly function as a seal. Generally, the outer diameter and the inner diameter of the dynamic seal housing may be varied depending on the design of the application. In a preferred embodiment, the inner diameter of the dynamic seal housing may be less than 10 inches, where the diameter of the screw shaft is less than 6 inches.

In some embodiments, there may be a cam, where the cam may have a guiding slot (not shown) to direct the feedstock plug for transmit into the subsequent decompression zone in the system. The single flight cam easily transmits the feedstock in the reverse direction of the cam without affecting the density of the plug, thereby minimizing the risk of the plug losing its compaction in the sleeve 111. In some other embodiments, the number and pitch and shape of the cam may also vary, and may not be limited to a singular cam. The feedstock flow through the cam may also be controlled by the thickness of the cam, and the cam can be configured with different pitch dimensions. In some embodiments, the cam front and back surface, i.e., the surface profiles may have different pitch rates.

In some alternative embodiments, varying the effective pitch of the cam is a feature that can be used to modulate the plug and seal density and the rate of passage through the cutter and guiding slot of the cam. The slot angle or passageway angle may also be varied. The location of the cam is also flexible, and the cam may be positioned along the horizontal axis anywhere after the dynamic seal housing.

Referring to FIG. 3, after passing through the dynamic seal housing 111, the feedstock is then transported to the decompressed sleeve 115, as well as an additional decompressed sleeve 124. In these two portions in the apparatus or system, the dynamic seal constructed from the feedstock is decompressed by the conveyer screw 117, where the thread pitch increases gradually, e.g., from 121 to 123, as the feedstock is transported towards the outlet, where the outlet may be further connected to a pyrolysis or combustion vessel (not shown). The increase in thread pitch allows the feedstock to decompress gradually, after the feedstock is cut off by the cam as shown in 122. In a preferred embodiment, while the dynamic seal is formed in the dynamic seal housing, the effect of the seal extends from the dynamic seal housing through to the decompressed sleeves due to the formation of a viscosity barrier following the principles of Darcy's and Fick's law.

Notably, in the two decompressed sleeves 115 and 124, the KSPS apparatus utilizes the existing vessel pressure located at the outlet to push the decompressed material or feedstock back towards the dynamic seal area located in the dynamic seal housing 111. In other words, the pressure of the gaseous mixture at the outlet pushes the feedstock back into the apparatus, packing the feedstock into the shorter pitch screw 121 area, adding an additional viscosity barrier and preventing blowback. In some embodiments, there may be additional components, such as fins, or anti-rotation bars (not shown) positioned in the decompressed sleeves 115, 124 to aid in the distribution of the volatile gas in the pyrolysis chamber.

Referring to FIGS. 1-4, the current KSPS apparatus utilizes a combination of internal and external features such as the screw shaft 120, the dynamic seal housing 111 and anti-rotation bars 113, the cut-off cam 122, and decompressed sleeves 121 and 124, and the vessel outlet pressure to create a continuous dynamic seal or plug in the apparatus. As shown in FIG. 1-2, utilizing a screw system with compression and decompression features on each side of the dynamic seal housing 111, in addition to the aforementioned features of the dynamic seal plug, the KSPS apparatus is an improvement over existing prior art, especially involving high pressure and high temperature conditions at the outlet. In comparison, the existing plug screw systems are prone to failure because the gases may leak through the pores in the plug, eroding the plug structure, causing the plug to disintegrate.

The various components of the apparatus, such as the inlet flange or sleeve 101, the tapered housing or sleeve 116, the compressed sleeve 114, the dynamic seal housing 111, the anti-rotation bars 113, as well as the decompressed sleeves 115, 124 may all be made from materials such as stainless steel. The stainless steel surface may be custom treated.

In the intended applications for the KSPS apparatus, the apparatus may be suitable when there is a substantial pressure and temperature difference between the KSPS inlet 90 versus the KSPS outlet 99 depending on the specifics of the conversion processes within the vessel. In a preferred embodiment, the pressure difference between the inlet and outlet may be more than 1 bar, and the flowrate and density of the inlet and outlet may be equal. In some embodiments, operating conditions for the KSPS apparatus range from 300 to 1800 Celsius, and 20 to 30 bar.

Figure 5:
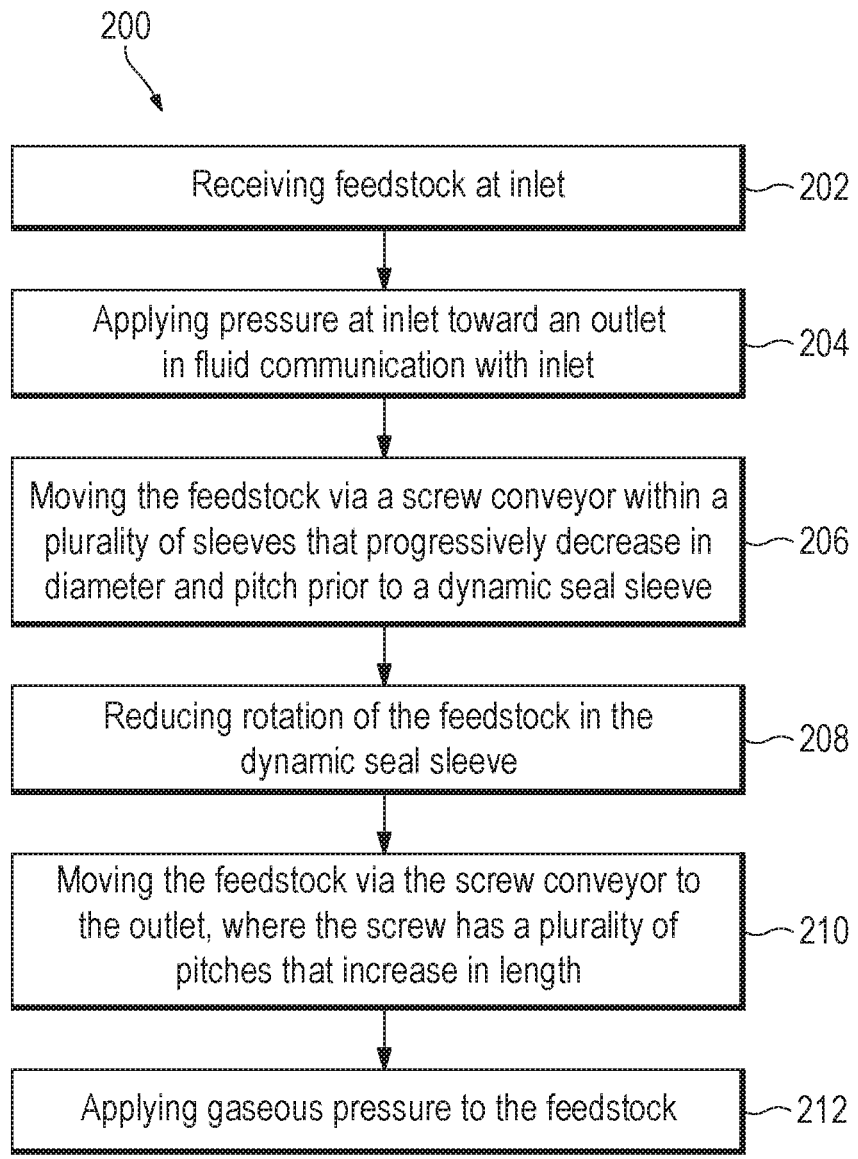
FIG. 5 shows an example of a process of creating a kinetic feed plug screw of the present disclosure.

Referring to FIG. 5, an illustrative example of the process 200 of creating a KSPS is shown, where feedstock is transferred from an inlet to an outlet into a pyrolysis vessel. In a preferred embodiment, the inlet and outlet have a pressure difference of at least 1 bar. In the first step 202, the feedstock is first received from an inlet. In the next step 204, positive pressure is applied at the inlet towards the outlet that is in fluid communication with the inlet. Subsequently 206, the feedstock is transferred or moved along from the inlet to the outlet via a screw conveyer, where the screw comprises a plurality of screw threads or sleeves and a shaft, where the screw threads or sleeves progressively decrease in diameter and pitch prior to the feedstock reaching the dynamic seal housing.

In the next step 208, as the feedstock reaches the dynamic seal housing, the feedstock is laterally compressed along the conveyer screw shaft to form a dynamic seal or an annular plug as the plug travels through the sleeve. In other words, the feedstock is sufficiently compacted in at least a portion of the dynamic seal housing to fluidly isolate the outlet from the inlet. In a preferred embodiment, anti-rotation bars placed along the length of the dynamic seal housing are used to significantly reduce the rotation of the moved feedstock. In some embodiments, the plug may be subsequently redirected by a cam where sections of the plug are cut off as the plug travels through the dynamic seal housing. As such, the feedstock is no longer sufficiently compacted to form the dynamic seal or annular plug from where the plug is cut off and downstream from that cut off. In the next step 210, the reduced rotation feedstock is then transferred via the screw conveyor to the outlet, where the screw conveyer has a plurality of pitches that increase in length prior to an outlet to decompress the feedstock, so that the feedstock may exit the outlet into the pyrolysis chamber or vessel. As the outlet is connected to the pyrolysis vessel, the gaseous pressure in the pyrolysis vessel forms a barrier and pushes the feedstock back into the outlet 212, allowing the annular plug to maintain sufficient density and prevent the gas at the inlet and outlet from mixing and causing blowback. Although FIG. 5 shows particular steps for a process of transferring feedstock into a pyrolysis vessel, other examples of the process may add, omit, replace, repeat, and/or modify one or more steps.

It will be appreciated that the invention is not restricted to the particular embodiment that has been described, and that variations may be made therein without departing from the scope of the invention as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A kinetic feed plug screw apparatus, comprising:
   (a) an inlet that receives a feedstock;
   (b) an outlet that is in fluid communication with the inlet and that outputs the feedstock;
   (c) a plurality of sleeves joined together and disposed between the inlet and the outlet, the plurality of sleeves including an inlet sleeve, a compression sleeve, a tapered housing sleeve disposed between the inlet sleeve and the compression sleeve, at least one decompression sleeve, and a dynamic seal sleeve disposed between the compression sleeve and the at least one decompression sleeve;
   (d) a conveyer screw contained within the plurality of sleeves, the screw having a shaft and threads that are attached to the shaft and spaced at a distance from an inner surface of the plurality of sleeves, the distance between the screw and the interior surface of the plurality of sleeves forming a passage for feedstock to travel from the inlet to the outlet, wherein the thread pitch of the screw decreases along the screw from the inlet sleeve to the tapered housing sleeve, the portion of the screw that is contained within the dynamic seal sleeve having at least one cam attached to the shaft and being free from threads, wherein the at least one cam substantially wraps around the shaft, wherein the threads run a first direction along the shaft and the at least one cam runs a second direction opposite the first direction along the shaft, and wherein the thread pitch of the screw increases along the screw from an inlet portion of the at least one decompression sleeve to an outlet portion of the at least one decompression sleeve; and (e) a plurality of anti-rotation bars that extends radially between the outer and inner surfaces of the dynamic seal sleeve, each bar including a tip that extends from the inner surface into the passage.

2. The apparatus of claim 1, wherein major diameter of the screw decreases from the inlet sleeve to the tapered housing sleeve.

3. The apparatus of claim 2, wherein each of the anti-rotation bars includes a flange portion that is opposed from the tip, the flange portion extending from the outer surface of the sleeve.

4. A kinetic feed plug screw apparatus for transferring feedstock, comprising:
   (a) an inlet that receives a feedstock;
   (b) an outlet that is in fluid communication with the inlet and outputs the feedstock;
   (c) a plurality of sleeves joined together and disposed between the inlet and the outlet, the plurality of sleeves including an inlet sleeve, a compression sleeve, a tapered housing sleeve disposed between the inlet sleeve and the compression sleeve, a decompression sleeve, and a dynamic seal sleeve disposed between the compression sleeve and the decompression sleeve;
   (d) a conveyer screw contained within the plurality of sleeves, the screw having a shaft and threads that are attached to the shaft and spaced at a distance from an inner surface of the plurality of sleeves, the distance between the screw and the interior surface of the plurality of sleeves forming a passage for feedstock to travel from the inlet to the outlet, wherein the thread pitch and pitch diameter of the screw decreases along the screw from the inlet sleeve to the tapered housing sleeve, the portion of the screw that is contained within the dynamic seal sleeve having at least one cam attached to the shaft and being free from threads, wherein the at least one cam substantially wraps around the shaft, wherein the threads run a first direction along the shaft and the at least one cam runs a second direction opposite the first direction, and wherein the thread pitch of the screw increases along the screw from an inlet portion of the decompression sleeve to an outlet portion of the decompression sleeve;
   (e) the dynamic seal sleeve further comprising an outer and inner surface, and a series of anti-rotation bars extending radially along the outer and inner surface, the bars having at least one length, at least one tip, and at least one flange, where the at least one length is equal to the length of the dynamic seal sleeve, and the at least one tip extends perpendicularly from the inner surface into the passage, and the at least one flange is exposed along the outer surface of the sleeve; and
   (f) the decompression sleeve having the outlet.

5. A method of transferring feedstock into a pyrolysis vessel, comprising:
   receiving the feedstock at an inlet;
   applying positive pressure at the inlet toward an outlet that is in fluid communication with the inlet;
   moving the received feedstock via a screw conveyor having a plurality of threads that run in a first direction within a plurality of sleeves that progressively decrease in diameter prior to a dynamic seal sleeve of the plurality of sleeves;
   reducing rotation of the moved feedstock within the dynamic seal sleeve of the plurality of sleeves via a cam of the screw conveyor that runs in a second direction opposite of the first direction, such that a dynamic seal is formed by the feedstock within at least a portion of the dynamic seal sleeve; and
   moving the reduced rotation feedstock via the screw conveyor to the outlet, where the plurality of threads of the screw conveyer has a plurality of pitches that (i) decrease in length from the inlet to the dynamic seal sleeve and (ii) increase in length from the dynamic seal sleeve to an outlet.

6. The method of claim 5, wherein reducing rotation of the moved feedstock also is via the lack of threads on a portion of the screw conveyor that is contained by the dynamic sleeve and via a plurality of anti-rotation bars that is attached to the dynamic seal sleeve and extends from an inner surface of the dynamic seal sleeve toward the screw conveyor.

7. The apparatus of claim 1, wherein the at least one decompression sleeve includes a first decompression sleeve and a second decompression sleeve attached to the first decompression sleeve, wherein the thread pitch of the screw increases from an inlet portion of the first decompression sleeve to an outlet portion of the second decompression sleeve.

* * * * *